United States Patent Office 3,197,422
Patented July 27, 1965

3,197,422
CURING OF EPOXY RESINS
William R. Peterson and Ralph E. McNay, Houston, Tex., assignors by mesne assignments, to Ashland Oil & Refining Company, Ashland, Ky., a corporation of Kentucky
No Drawing. Filed Jan. 17, 1963, Ser. No. 252,036
6 Claims. (Cl. 260—2)

This invention relates to new methods of curing epoxy resin compositions, to novel hardenable compositions which contain epoxy resins, and to hardened resin-containing products which include said hardenable compositions in "cured" form.

By "epoxy resin" is meant all those resins which are characterized by the following common functional group:

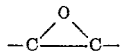

Persons skilled in the art employ a variety of designations for the above functional group and for the resins which contain it. Thus, such resins are identified not only by the term epoxy, but also by the terms "epoxide," "ethoxy," "ethoxyline," "glycidyl," "oxirane" and others.

Epoxy resins in general, and the epoxy resin products of the present invention, are useful in the production of compositions for coating, casting, impregnating, adhesive and laminating purposes among others. Epoxy resins are ordinarily produced initially in the form of uncured intermediate products which are usually honey-colored liquids, or brittle amber solids which become liquid when heated. The various useful compositions in which these uncured intermediates are used are in a liquid or meltable form so that they may readily be applied to a substrate or placed in a mold. Thereafter, the epoxy resin must be irreversibly converted to a hard, solid condition.

The operation of irreversibly converting a liquid or fusible resin to an infusible solid is known as "curing." The present invention is concerned with curing epoxy resins by adding hardening agents to them, a "hardening agent" being defined as any substance which is capable, when added to an epoxy resin in an effective amount, of irreversibly reacting with the epoxy resin to form a hard resinous product. A properly hardened or cured epoxy resin may demonstrate some softening upon heating, but will never revert to a liquid state. Hardening agents are sometimes also referred to as "curing agents" or "curatives."

A number of hardening agents for epoxy resins are already known. Among the best known are certain organic acids and their anhydrides (or substances which yield them under certain conditions), aromatic or aliphatic amines and salts thereof, polyamide resins, and Mannich bases.

It is a principal object of this invention to provide a novel method for curing epoxy resins. It is a further object to provide hitherto unrecognized hardening agents for use alone or in combination with other hardening agents for the curing of epoxy resins. Still another object is the provision of novel, hardenable epoxy resin formulations. A further object is the provision of hardenable epoxy resin compositions which may be applied to a substrate (a base material) with or without the aid of solvents. Another object is the provision of hardened resinous products comprising the reaction product of an epoxy resin and an hardening agent produced in accordance with the present invention. Additional objects of the invention can be discerned in the description of our invention which follows.

The objects of this invention are achieved by utilizing as curatives extracts of the plant Grindelia which will irreversibly react with epoxy resins when incorporated therein to form hard infusible masses. Thus, we have discovered that there is obtainable by the steps of leaching the plant Grindelia with an aliphatic hydrocarbon solvent, or solvent system predominantly aliphatic hydrocarbons, and then extracting the insoluble portion with an aromatic solvent, an extract; which extract is a curative for epoxy resins. These extracts then are characterized as aliphatic hydrocarbon solvent insoluble, lower alkanol soluble extracts of the plant Grindelia. We have discovered also that epoxy resins can be cured with the aid of a curative obtainable by further treatment of the aliphatic hydrocarbon solvent insoluble-lower alcohol soluble extract with aromatic hydrocarbon solvents. Moreover, chemically modified forms of these curatives are effective.

The usual mode of practicing our method will involve heating a mixture containing an epoxy resin and one of our novel curatives. While the invention is not restricted to methods involving heating, we prefer to employ heat when our novel curatives constitute the sole hardening agents in the resinous mixture. Temperatures of 150° C. and above can be used. With these higher temperatures, hard cures can ordinarily be obtained in an hour or less. It is usually considered best practice, however, to employ the lowest curing temperature that will meet one's production schedule. Thus, insofar as low temperature cures of long duration can be tolerated, they are preferred.

We comprehend as falling within the scope of our invention any hardenable or uncured resin containing compositions which contain an epoxy resin and one of our novel curatives in sufficient amount to cure the epoxy resin, regardless of whether the epoxy resin and curative (considered together) constitute the whole of the hardenable resin, a principal part thereof, or a minor part. The cured resin compositions of the present invention are of similar scope.

As implied above, our novel curatives need not be the sole hardening materials employed in the method and compositions of the present invention. Indeed, we contemplate the use of any known hardening agents which are compatible with the modified and unmodified Grindelia extracts we have set forth. Among the other materials which may be added to our novel epoxy resin compositions are pigments, other resins, dyes, extenders, solvents, softening agents and plasticizers. Thus, the novel products of the present invention are cured and uncured resinous compositions containing an epoxy resin, a modified or unmodified extract of the plant Grindelia and, optionally, one or more additional materials included for the purpose of achieving greater durability, economy, ease of production and application and so forth.

The plant, Grindelia, from which the curing agents of this invention are derived belongs to the tribe Asteroideae of the natural family Compositae. The genus, Grindelia, includes some twenty-five species, six or eight of which are found in South America. The remainder occur in the United States, mostly west of the Mississippi River, generally in arid and semi-arid plateau regions, although certain species also appear in regions where rainfall is more plentiful. A particularly prevalent plant in the United States in the specie *G. squarrosa*, commonly referred to as "curly cup gumweed." Other well-known species are *G. humilis*, "marsh gumweed," *G. camporus*, "field gumweed," *G. robusta*, *G. nanna*, *G. fastigita*, *G. perennis*, and *G. blakei*, among others. The varied species are perennial or biennial and produce in varying amounts depending upon the specie, a sticky, resinous substance which manifests itself on the stem and leaves, and especially on the flower heads. From this characteristic is derived the common name "gum plant" or "gum weed." Extracts of the plant have been shown to exhibit some utility in certain areas of the pharmaceutical field, but beyond this there has been apparently no further investigation of the plant for any purpose, except by the present inventors.

Although other separation methods may undoubtedly be employed to derive our novel epoxy resin curatives from the plant Grindelia, we prefer to employ solvent extraction methods. In accordance with a preferred extraction scheme, the dried and pulverized plant, including leaves, stems and flowers, is extracted with any common aliphatic hydrocarbon solvent, or solvent system containing predominantly aliphatic hydrocarbons. The material which does not dissolve—the "hydrocarbon solvent insoluble fraction"—is separated and retained. The material which does dissolve is discarded along with the solvent. Of course, the solvent may be recovered if desired.

The hydrocarbon solvent insoluble fraction is then extracted with a lower alkanol, which is herein defined as any alkanol containing not more than about five carbon atoms: methanol, ethanol, propanol, isopropanol, butanol, the isobutanols, amyl alcohol and the isoamyl alcohols. Although methanol is preferred, any lower alkanol can be used. The lower alkanol extracts a viscous oil from the above-mentioned hydrocarbon solvent insoluble fraction. When separated from the alkanol, this oil constitutes a "lower alkanol extract" of the aliphatic hydrocarbon solvent insoluble fraction which may be used to cure an epoxy resin in the manner described above.

An even better curative for epoxy resins is obtainable by further extraction with an aromatic solvent of the above-described viscous oil. This second curative constitutes a more specific extract of the first curative. To obtain this more specific extract, the viscous oil, or said "lower alkanol extract," is mixed with an aromatic solvent such as benzene. So much of the viscous oil as remains undissolved is separated from the benzene layer and discarded. Then the benzene layer is distilled to remove the benzene, leaving behind the "benzene extract" which is also a viscous oil and a curative for epoxy resins.

According to another modification of our invention, either of the above-described curatives may be chemically modified prior to use by the formation of a reaction product between it and an α,β-unsaturated organic acid or anhydride. While applicants do not wish to be bound by theory, it is believed that the reaction product results by formation of a Diels-Alder diene-type addition product between the extract and the α,β-unsaturated organic acid or anhydride. Among the various acids and anhydrides which may be used to form the reaction product are maleic acid, maleic anhydride, fumaric acid, itaconic acid, itaconic anhydride, the half esters of maleic and fumaric acids, half-esters of itaconic acid, and others. The product may be subjected to various after treatments or may be formed in the presence of other materials in addition to the α,β-unsaturated acid or anhydride.

The novel curatives of the present invention are usable in connection with any epoxy resin. However, even though we have no intention of limiting our invention to any particular epoxy resin, we will briefly mention some of the classes of epoxies which are presently available: the glycidyl polyethers of polyhydric phenols obtained by reacting a polyhydric phenol with an excess of a chlorohydrin; polyepoxy polyethers obtained by reacting a halogen-containing epoxide with a polyhydric alcohol, and subsequently treating the resulting product with an alkaline component; the polyepoxy polyethers obtained by esterifying a polycarboxylic acid with an epoxy-containing alcohol; the polyepoxy polyhydroxy polyethers obtained by reacting a polyhydric alcohol or phenol with a polyepoxide; the hydroxy-substituted polyepoxy polyethers obtained by reacting a slight excess of a halogen-containing epoxide with a polyhydric phenol; and the polymers and copolymers of the epoxy-containing monomers possessing at least one polymerizable ethylenic linkage. These epoxy resins also result from reaction between hydrogen peroxide or peroxygen acids with butadiene polymers and copolymers.

A common type of epoxy resin is made by bringing together epichlorohydrin and a di-hydroxy compound, of which bisphenol-A is a representative example. Other useful di-hydroxy compounds include glycerol, resorcinol, cresol and various glycols. In the usual case, the oxygen ring of each epichlorohydrin molecule is thought to open and react with one of the hydroxyl groups of the dihydroxy compound, forming an ether-alcohol. Then, hydrochloric acid is split off and a new epoxy group is spontaneously generated at the outer—or what was formerly the chlorine—end of the epichlorohydrin residue.

If epichlorohydrin and the di-hydroxy compound react in a molar ratio of 2:1, the result is a di-epoxide molecule. If this ratio of 2:1 is increased, two or more epichlorohydrin molecules attach themselves in series with some of the hydroxyl groups of the di-hydroxy compounds, resulting in the formation of molecules having hydroxyl groups in addition to epoxy groups. If the above-mentioned ratio is decreased to say 1:1, the result will be a molecule in which only one of the hydroxyl groups of the dihydroxy compound has reacted with epichlorohydrin. Thus, the resultant molecule has only one epoxide ring.

The "functionality" of an epoxy resin molecule equals the number of epoxide rings found in the molecule. If the molecule has one epoxide ring its functionality is "1." The average of the functionalities of all the molecules in a representative sample of a particular resin constitutes the functionality of that resin. Since very few, if any, commercial epoxy resins can be said to consist wholly of molecules of the same functionality, commercial resins seldom have whole number functionalities. Commercial epoxy liquid intermediates may average as high as 1.9+ epoxides per molecule, but the epoxide content of a solid resin is usually considerably lower.

One of the features of our novel curatives disclosed herein is that they are usable with even monofunctional epoxy resins. Our novel curatives will homopolymerize. Thus, when copolymerized with a monofunctional epoxy resin they can provide a polymeric framework for the attachment of mono-epoxy molecules.

It is not possible to state absolute upper and lower limits for the relative quantities of epoxy resin and Grindelia extract to be used in our novel polymer and resin compositions. Because of the ability of the Grindelia extracts to homopolymerize, polymeric products can still be obtained from epoxy resin-Grindelia extract formulations in which the *epoxy* resin content approaches zero. On the other hand, if the quantity of the Grindelia curative were made to approach zero, a point would be reached at which the rate of cure would be reduced to a completely impractical level. Nevertheless, those skilled in the art will readily appreciate that it would be virtually impossible to establish a concrete figure for a minimum amount of curative which would serve equally well for all epoxy resins, since all epoxy resins do not possess the same degree of functionality, i.e. reactivity and proclivity towards curing. Therefore, the only quantitative restriction which can properly be placed upon the amount of curative must be an "effective" amount. By "effective" is meant that amount which is required to bring about an irreversible conversion to a hard, solid mass.

In actual practice, the minimum amount of curative required for any given epoxy resin may be readily determined by one skilled in the art using well-known laboratory control experiments. These procedures involve mixing the curative in say a 50–50 ratio with an epoxy resin for which it is desired to learn the minimum effective amount of curative, then heating the mixture and observing the quality of the cure. If a 50–50 ratio produces a good cure, then another trial is made with a lower percentage of curative and the quality and rate of cure are then observed. This procedure of using steadily smaller and smaller amounts of curatives in each successive run is repeated until the quality and rate of cure reaches the marginal level. The amount of curative used in the last run, is the minimum effective amount for the particular epoxy resin under consideration.

The following examples are presented with the intention of illustrating the invention without restricting it in any sense. All parts are by weight unless otherwise stated.

EXAMPLE I

*A hydrocarbon solvent insoluble fraction of Grindelia*

1,000 parts of the whole plant *G. squarrosa* are pulverized with a hammer mill and are subjected to extraction by simple percolation at room temperature with 2,000 parts of commercially available Kuhn's VM & P CH 47 (trade name) solvent, a naphtha containing about 83 percent aliphatic and 17 percent aromatic material and having a boiling range of 224 to 294° F. After 30 minutes, the resultant slurry is filtered and dried, yielding 880 parts of a hydrocarbon solvent insoluble fraction of the plant Grindelia.

EXAMPLE II

*A lower alkanol extract*

The hydrocarbon solvent insoluble material isolated in accordance with the procedure of Example I is mixed with 1,500 parts of methanol and the resultant slurry is filtered to remove the alcohol insoluble fraction. The filtrate is then subjected to distillation to remove the solvent, leaving 105 parts of a viscous oil, constituting a lower alkanol extract of a hydrocarbon solvent insoluble fraction of the plant Grindelia.

EXAMPLE III

*A benzene extract*

50 parts of the methanol soluble product obtained in accordance with the procedure of Example II are mixed with 100 parts of benzene and the resultant slurry is filtered to remove the benzene insoluble fraction. The filtrate is then distilled to remove the benzene. 38 parts of a viscous oil are left behind, constituting a benzene extract of a lower alkanol extract of a hydrocarbon solvent insoluble fraction of the plant Grindelia.

EXAMPLE IV

*Maleic acid anhydride adduct of lower alkanol extract*

85 parts of a lower alkanol extract obtained in accordance with the procedure of Example II are mixed with 15 parts of maleic anhydride. The mixed materials are fused by heating to about 100° C. Heating was continued for 5–10 minutes to complete the reaction. A viscous product is obtained.

EXAMPLE V

*Maleic anhydride adduct*

The procedure of Example IV is repeated, using 75 parts of the lower alkanol extract and 25 parts of maleic anhydride. A viscous product is obtained.

EXAMPLE VI

*Fumaric acid adduct*

The procedure of Example IV is repeated, using 70 parts of the lower alkanol extract and 30 parts of fumaric acid. A viscous product is obtained.

EXAMPLE VII

*Fumaric acid half-ester adduct*

The procedure of Example IV is repeated using 67 parts of the lower alkanol extract and 33 parts of the methyl alcohol half ester of fumaric acid. A viscous product is obtained.

EXAMPLE VIII

*Maleic anhydride adduct of benzene extract*

The procedure of Example IV is repeated, using 25 parts of maleic anhydride and 75 parts of a benzene extract produced in accordance with Example III. A viscous product is obtained.

EXAMPLE IX

*Coating glass and aluminum substrates*

67 parts of a commercially available epoxy resin Gen-Epoxy 190 (trade name), a liquid reaction product of epichlorohydrin and bisphenol-A having an epoxide equivalent of 187–191 and a viscosity (Brookfield) of 11,000–14,000 cps. are mixed thoroughly with 33 parts of the lower alkanol extract of Example II. The resultant mixture is spread on glass and aluminum substrates with a coating thickness of 5±2 mills. The substrates are held at a temperature of 150° C. for 1 hour. After cooling, the films are found to have cured hard and to have developed satisfactory solvent resistance and adherence to the substrates.

EXAMPLE X

The procedure of Example IX is repeated, substituting the benzene extract of Example V for the product of Example II. Similar results are obtained.

EXAMPLE XI

*Coating tin plate substrate*

Various proportions of GenEpoxy 190 are mixed thoroughly with modified and unmodified Grindelia extracts produced in accordance with Examples 2, 3, 4, 5 and 7. The resultant samples are designated by numbers 1–10. A uniform amount of each sample is spread to a uniform thickness of 5±2 mills. on rectangular tin-plated steel blanks numbered to correspond with the various samples placed thereon. The substrates are immediately placed in an oven and are held there at a temperature of 150° C. for 1 hour. After removal from the oven, the coated substrates are then allowed to cool. Then they are examined for uniformity, smoothness of cure and for the hardness, flexibility and adhesion of the film of resin adhering thereto. Each sample is rated against standard samples of cured, commercial epoxy resin-coated substrates designated as "poor," "fair," "satisfactory," "good," and "excellent." The results are summarized in the following table:

| Run No. | Curative from Ex. | Weight Percent Curative | Weight Percent Epoxy | Cure | Hardness | Flexibility | Adhesion |
| --- | --- | --- | --- | --- | --- | --- | --- |
| 1 | 2 | 33 | 67 | Sat | Fair | Ex | Fair |
| 2 | 2 | 38 | 62 | Sat | Fair | Good | Fair |
| 3 | 2 | 50 | 50 | Sat | Good | Fair | Fair |
| 4 | 2 | 75 | 25 | Sat | Good | Fair | Poor |
| 5 | 3 | 50 | 50 | Good | Good | Good | Fair |
| 6 | 4 | 50 | 50 | Good | Good | Fair | Fair |
| 7 | 5 | 25 | 75 | Sat | Fair | Good | Fair |
| 8 | 5 | 33 | 67 | Good | Good | Poor | Good |
| 9 | 5 | 50 | 50 | Sat | Good | Fair | Fair |
| 10 | 7 | 50 | 50 | Good | Good | Poor | Fair |

Ex=excellent, Sat.=satisfactory.

From the above table, it should be apparent that the present invention makes possible the production of acceptable epoxy resin coating compositions in which no volatile solvents are required. This is a valuable feature of the present invention, since there are many disadvantages involved in working with solvent-containing lacquers, such as fire hazards, ventilation problems and the expense of solvents. On the other hand, solvents may be used in our novel compositions under any particular circumstances in which the presence of solvent appears desirable.

EXAMPLE XII

*A bulk polymer containing epoxy resin and lower alkanol extract*

The mixture employed in Example IX is utilized. The mixture is placed in a foil cup and is held at a temperature of 90° C. for 16 hours. A hard casting is obtained.

EXAMPLE XIII

*A bulk polymer containing epoxy resin and maleic acid adduct of lower alkanol extract*

33 parts of the product of Example V and 67 parts of GenEpoxy 190 are treated in accordance with the procedure of Example XI. A hard casting is obtained.

It will be apparent that some modification can be made in the present invention without departing its spirit and scope.

Primarily the invention concerns new and novel compositions, and the method of forming such compositions, comprising the incorporation of extracts of the plant Grindelia in epoxy resins in quantity sufficient to form hard infusible masses.

Suitably, prior to the removal and recovery of the desired extract, from the plant Grindelia, with a lower alcohol the plant is first leached with an aliphatic hydrocarbon solvent, or solvent system containing predominantly aliphatic hydrocarbon solvents, preferably those containing up to about 12 carbon atoms. For purpose of this invention an aliphatic hydrocarbon solvent is said to be predominantly aliphatic if it contains at least 50 percent aliphatic hydrocarbons. Exemplary of such solvents, and solvent systems, are mineral spirits, VM & P naphtha, hexane, heptane, decane, dodecane and the like.

The residual plant, following this treatment, is then contacted with a lower alcohol, such as methanol, propanol, amyl alcohol or the like to obtain an alcohol soluble extract.

Following this treatment with alcohol, the novel curative is contained within the alcohol, but the alcohol can be removed and the residual curative further extracted with an aromatic hydrocarbon solvent to yield an even more effective curative. Suitable solvents for this extraction are those containing up to about 12 carbon atoms, and higher, as for example benzene, toluene, xylenes, cumene and the like. Other solvents having properties similar to aromatic hydrocarbon, as for example tetrahydrofuran can also be used and a clean extraction also obtained.

The viscous oil obtained after removal of the aromatic hydrocarbon solvent is especially suitable as a curative in the practice of this invention and can be even further chemically modified in accordance with the procedures above disclosed.

We claim:

1. A method of curing an epoxy resin containing more than one

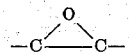

functional group which comprises: heating a mixture comprising said epoxy resin and as a curing agent a hydrocarbon insoluble-alcohol soluble extract of the plant Grindelia obtained by extracting said plant with a liquid aliphatic hydrocarbon and then extracting the hydrocarbon insoluble residue with a monohydric alcohol of from 1–5 carbon atoms, the amount of said curing agent being such as will effect irreversible conversion of said epoxy resin to a hard, solid mass.

2. A method according to claim 1 in which said extract is obtained from the plant *Grindelia squarrosa*.

3. A method according to claim 1 in which said hydrocarbon insoluble alcohol-soluble extract is also an aromatic hydrocarbon soluble extract, the hydrocarbon insoluble-alcohol and aromatic hydrocarbon soluble extract being obtained by extracting said hydrocarbon insoluble-alcohol soluble extract with an aromatic hydrocarbon.

4. A hard, solid resinous mass obtained by heating a mixture comprising an epoxy resin containing more than one

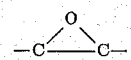

functional group and as a curing agent a hydrocarbon insoluble-alcohol soluble extract of the plant Grindelia obtained by extracting said plant with a liquid aliphatic hydrocarbon and then extracting the hydrocarbon insoluble residue with a monohydric alcohol of 1–5 carbon atoms, the amount of said curing agent being such as will effect irreversible conversion of said epoxy resin to said hard, solid mass.

5. A hard, solid resinous mass according to claim 4 in which said extract is obtained from the plant *Grindelia squarrosa*.

6. A hard, solid resinous mass according to claim 4 in which said hydrocarbon insoluble-alcohol soluble extract is also an aromatic hydrocarbon soluble extract, the hydrocarbon insoluble-alcohol and aromatic hydrocarbon soluble extract being obtained by extracting said hydrocarbon insoluble-alcohol soluble extract with an aromatic hydrocarbon.

References Cited by the Examiner

UNITED STATES PATENTS 2,894,920   7/59   Ramos _____ 260—9
3,098,052   7/63   Schmitz et al. _____ 260—24

WILLIAM H. SHORT, *Primary Examiner.*
TIMOTHY D. KERWIN, *Examiner.*